United States Patent [19]

Godard

[11] Patent Number: 4,563,681

[45] Date of Patent: Jan. 7, 1986

[54] TONE RECEIVER FOR DIGITAL DATA COMMUNICATION SYSTEMS

[75] Inventor: Dominique Godard, Le Rouret, France

[73] Assignee: International Business Machines Corporation, Armonk, N.Y.

[21] Appl. No.: 504,008

[22] Filed: Jun. 13, 1983

[30] Foreign Application Priority Data

Jun. 25, 1982 [EP] European Pat. Off. ........ 82430016.4

[51] Int. Cl.[4] .................... H04Q 5/00; G06F 7/38
[52] U.S. Cl. ................. 340/825.71; 364/572; 364/574; 364/724; 375/103
[58] Field of Search ............ 375/99, 102, 103, 8, 375/34; 455/303, 306, 307; 340/825.48, 825.71; 364/724, 825, 572, 574; 370/110.3, 113; 179/84 VF; 328/138

[56] References Cited

U.S. PATENT DOCUMENTS

| | | | |
|---|---|---|---|
| 3,502,986 | 3/1970 | Lucky | 325/38 |
| 4,053,750 | 10/1977 | Constant | 364/724 |
| 4,156,919 | 5/1979 | Constant | 364/724 |
| 4,228,517 | 10/1980 | Constant | 364/724 |
| 4,305,133 | 12/1981 | Amada et al. | 364/724 |

*Primary Examiner*—John W. Caldwell, Sr.
*Assistant Examiner*—Sharon L. Hodgkins
*Attorney, Agent, or Firm*—John B. Frisone

[57] ABSTRACT

A device for detecting the presence of an alarm tone of a given frequency within a received signal carrying digital data in addition to said tone. The receiver comprises an analog-to-digital converter (42) the output of which is applied to a first recursive bandpass filter centered at the frequency of the alarm tone and the feedback loop of which includes a limiter. In addition, an input feedforward loop is provided for adding (at 58) the output signal from the converter (42), as multiplied by a coefficient $\gamma$, to the output signal from the limiter. The output signal from the adder (58) is hard limited (at 44), then passed through a second bandpass filter. The energy of the signal obtained at the output of said second filter is then measured to provide indication of a tone's being received when said energy exceeds a predetermined threshold.

6 Claims, 3 Drawing Figures

TONE RECEIVER FOR DIGITAL DATA COMMUNICATION SYSTEMS

BACKGROUND OF THE INVENTION

1. Field of the Invention

This invention relates to a tone receiver and, more particularly, to a receiver including a detector for detecting a given frequency signal received simultaneously with a signal carrying digital data.

2. Description of the Prior Art

In a digital data communication system, whether of the point-to-point type or of the multipoint type, modulators-demodulators (modems) are used as interfaces between the Data Terminal Equipment (DTE) and the transmission path. The purpose of these modems is to convert the data to be transmitted into a signal the characteristics of which are compatible with the passband of the transmission path. Because of the high cost of the transmission path, the data from several terminals usually are sent down the transmission path through one modem and several modems may be connected to the same transmission path. Because the resulting communication network is comparatively complex, it is desirable to reduce to a minimum the duration of those time intervals during which the transmission of data is interrupted due to equipment failures.

Whenever a failure occurs, one of the first objectives is to locate as accurately as possible the network component involved. Many solutions to this problem have been proposed. One of these consists in providing each modem with a device which, in the event of failure of the modem or any one of the components with which it is associated, generates a tone of a given frequency, referred to as alarm tone, and sends it to one of the modems of the network, called master modem, where it is to be detected and identified. The alarm tone frequency is chosen so that it lies slightly outside the spectrum of the data signal sent by the modem.

At first sight the detection and the identification of the alarm tone by the master modem would seem to involve no difficulty as it might be assumed that this would be a mere matter of passing the received signal through a very narrow band filter centered at the frequency of the alarm tone and then measuring the energy of the filtered signal. However, quite apart from the cost of such a filter, this solution would be inefficient since an absolute energy measurement would be meaningless and a relative measurement would be ineffective in view of the fact that the relative level of the alarm tone with respect to the data is, in practice, essentially variable. This could result in spurious alarm tones, being erroneously detected as valid alarm tones. Such a result could have serious consequences since the network is switched to a so-called test mode whenever an alarm tone is detected, thereby inhibiting to some extent the normal transmission of data throughout the whole network. It is therefore essential that spurious alarm tones should be ignored.

It has also been proposed to pass the signal through a hard limiter before filtering it and to measure the signal energy obtained at the output of the filter. This solution, while it allows the effects of random noise (normal line noise) to be minimized, is unfortunately ineffective in a network in which digital data are transmitted over the network simultaneously with the alarm tone and in which the level of the received alarm tone may be lower than that of the data.

The failed modem can be located in any part of the network, or, in other words, at any distance from the master modem. As a result, the relative level of the alarm tone to be detected is essentially variable. The receiver of the master modem must therefore be capable of detecting a signal the level of which may range from saturation to $-30$ db with respect to the data.

SUMMARY OF THE INVENTION

The invention contemplates a tone receiver for use in a digital data communication system for detecting the presence within a received signal of an alarm tone the frequency of which is outside of the data signal spectrum. The receiver includes an analog-to-digital converter (ADC) for sampling and converting samples $X_n$ of the received signal to digital form; a first recursive digital bandpass filter centered at the frequency of the tone signal for receiving and passing the tone signal when present; a limiter inserted serially in the feedback loop of the said first bandpass filter; an input feedforward loop connected to said ADC and providing a predetermined gain Y; an adder connected to the output of said limiter and to said feedforward loop; a hard limiter connected to said adder; a second digital filter connected to said hard limiter; and, means for measuring the energy V of the signal provided by said second digital filter; wherein said tone is considered received when said evergy V exceeds a predetermined threshold value.

Accordingly, is is the object of the present invention to provide a receiver for detecting the presence of an alarm tone in a signal carrying digital information or data with an extremely variable tone-to-data signal ratio.

The foregoing and other objects, features and advantages of the invention will be apparent from the following description of a preferred embodiment of the invention, as illustrated in the accompanying drawings.

DESCRIPTION OF THE PREFERRED EMBODIMENT

Figure 1:
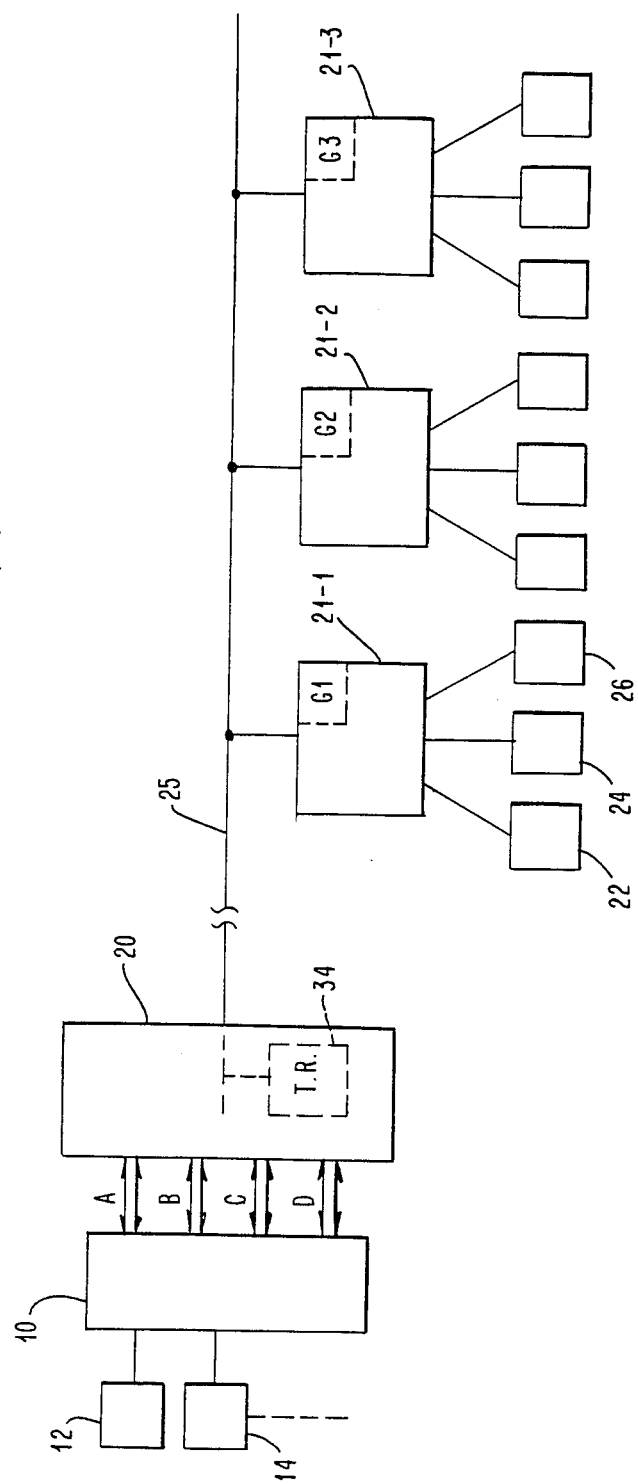
FIG. 1 shows the configuration of a communication system.

Referring now to FIG. 1, the general configuration of a multiplex communication system is shown. A central (master) unit 10 manages communications between terminals (DTE) 12, 14, etc., and other terminals (DTE's) 22, 24, 26, etc. Central unit 10, which may be, for example, an IBM 3705 Communications Controller, to be itself considered here as a DTE, is connected to a master modem 20 via channels A, B, C, D. Modem 20 is connected via a transmission path 25 to tributary modems 21-1, 21-2, 21-3 associated with terminals 22, 24, 26, etc.

The modems, which may be IBM 3863, 3864 or 3865 Modems, convert digital data supplied by the terminals into an analog waveform (called data signal) whose frequency characteristics are compatible with the passband of the transmission path. In what follows, this waveform will be assumed to represent data.

To this end, the bits to be transmitted that are supplied by terminals associated with the same modem are first divided into groups by time-division multiplexing in a predetermined order. The groups of bits are then converted into sequences of data symbols which are transmitted one at a time at instants which have a regular T-second spacing and are called signaling instants. A double sideband-quadrature carrier (DSB-QC) modulation technique is used to transmit the data symbols. This consists in causing a discrete value of one or more characteristics (amplitude, phase) of the carrier to correspond to each symbol. The term DSB-QC modulation is used here in a broad sense and encompasses all modulation techniques wherein the transmitted signal can be represented by superimposing two amplitude modulated quadrature carriers.

The class of modulation techniques termed DSB-QC includes, in particular, phase shift keying, amplitude/-phase shift keying and quadrature amplitude modulation.

Thus, the signals that carry the digital data and travel over the transmission path are analog signals and occupy a well-defined frequency bandwidth.

Whenever a terminal or a modem fails, the central unit 10 must be notified in order that the operator may in turn be alerted. To this end, the tributary modems 21-1, 21-2 and 21-3 are respectively provided with generators G1, G2 and G3 which, in such cases, generate an alarm tone exhibiting a fixed frequency in the range of 300 to 350 Hz and which, therefore, should appear to lie outside the passband of the modems. A frequency of 325 Hz is a suitable choice in that it will entail a minimum of interference with the harmonics of the 50 or 60 Hz frequency of the main power supply. Let us now assume, by way of example, that tributary modem 21-1 fails and wants to signal this fact. Generator G1 of modem 21-1 therefore sends the 325 Hz alarm tone to master modem 20, which must be able to detect this tone and inform central unit 10 accordingly. Normally, tributary modems 21-1 to 21-3 only transmit data when allowed to do so by central unit 10 through master modem 20. However, the alarm tone can be sent by any of generators G1-G3 at any time, and in particular while any of the modems, other than the failed one, is transmitting data.

Upon receiving the alarm tone as detected by the receiver (TR) 34, master modem 20 initiates a particularly laborious test procedure intended to pinpoint the causes of the failure before alerting the operator. This test procedure inhibits partially at least digital data transmissions between master modem 20 and the tributary modems. It is therefore highly desirable to ensure that no erroneous detection of the alarm tone will occur. Also, the receiver associated with master modem 20 must respond very quickly since, in some cases, such as failure of the main power supply, the alarm tone generator in the failed tributary modem would use a standby power supply that would allow the tone to be sent only during a relatively short time interval.

A prior art test system of the above type is described in an article by S. Huon and R. Smith entitled: "Network Problem—Determination Aids in Microprocessor-Based Modems", appearing in *IBM Journal of Research & Development*, Vol. 25, No. 1, Jan. 1981.

Figure 2:
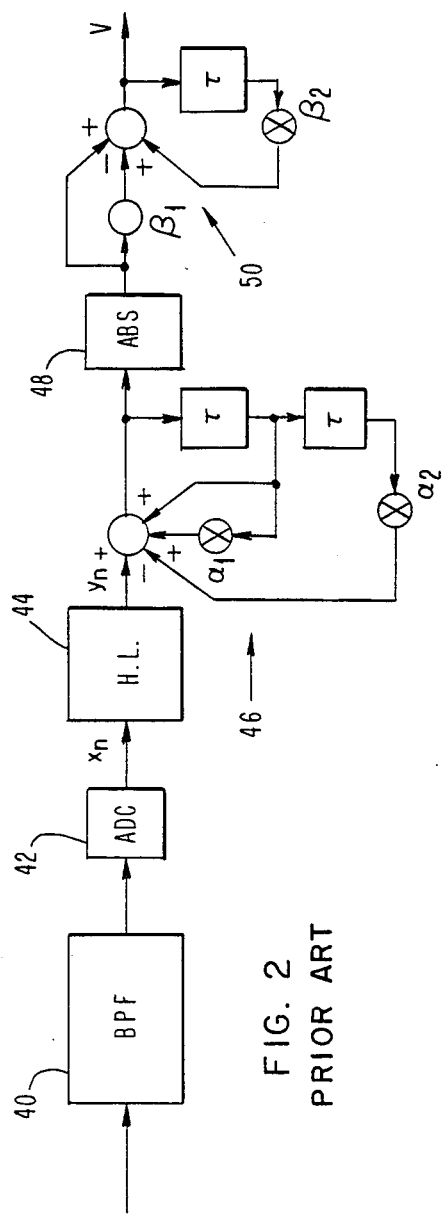
FIG. 2 shows a tone receiver incorporating prior art components.

Outside those time intervals during which the master modem 20 receives data, the alarm tone can be detected by means of the tone receiver 34 made according to the design shown in figure 2 and which includes the hard limiter mentioned earlier.

In this case, the input signal applied to the tone receiver is first passed through an analog bandpass filter 40 to eliminate part of the line noise. The signal obtained at the output of filter 40 is sampled 4800 times per second in an analog-to-digital converter (ADC) 42. Let $X_n$ be the sample obtained at the $n^{th}$ sampling instant. After they have been converted to digital form in ADC 42, the samples $\{X_n\}$ are fed to a hard limiter (HL) 44 which responds by supplying a signal $y_n$ such that:

$$\begin{cases} Y_n = A & \text{if} \quad X_n \geq 0 \\ Y_n = -A & \text{if} \quad X_n < 0 \end{cases} \quad (1)$$

The samples $\{Y_n\}$ are then fed to a second-order recursive filter 46 the Z-transfer function of which is in accordance with the relation $$G(z) = \frac{1}{1 - 2\mu \cos 2\pi f_0 \tau \, z^{-1} + \mu^2 z^{-2}} \quad (2)$$

where $f_o = 325$ Hz and $\tau = 1/4800$ sec.

The bandwidth of filter 46 is dependent, in particular, upon the value of coefficient $\mu$, which in this example is chosen equal to 0.985. The decimal values of the two coefficients of filter 46 are $\alpha_1 = 0.7944$ and $\alpha_2 = 0.9702$. In practice, these coefficients are coded with 12 bits, and normalized to one.

Characteristic A of the hard limiter is chosen so that filter 46, taking its gain into account, will not saturate (i.e. the amplitude of its output signal will remain less than 1 ) upon receiving an alarm tone of fixed frequency. The decimal value of A is chosen equal to 0.00916.

The output of filter 46 is applied to an absolute value measuring circuit (ABS) 48 the output of which is in turn applied to a first-order low-pass filter 50. Circuit 48 and filter 50 may be considered as measuring the signal energy at the output of narrow band filter 46, or more precisely the signal amplitude V which is deemed equivalent thereto for present purposes. The values of coefficients $\beta_1$ and $\beta_2$ of filter 50 are chosen equal to 0.98.

In practice, the tone receiver will only detect the presence of an alarm tone if the energy V exceeds a detection threshold $V_o$ (using a compare device not shown) in the decimal range 0.24 to 0.30 (coded with 16 bits) during at least 100 consecutive symbol intervals or in other words during 100 consecutive signaling instants, with the energy measurements being performed at said instants.

Figure 3:
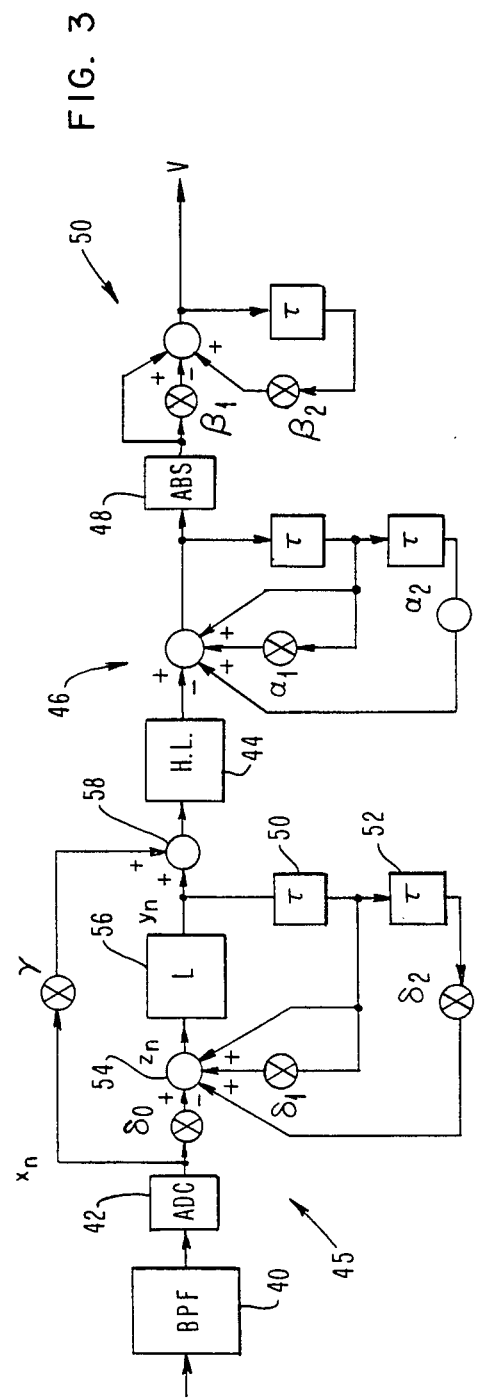
FIG. 3 shows a tone receiver in accordance with the invention.

However, the device of FIG. 2 cannot perform efficiently whenever data signals and an alarm tone are received simultaneously since the level of the alarm tone may be much lower than that of the data signal, in which case there is a definite risk of the tone's failing to be detected. This is the problem addressed by the improved tone receiver of FIG. 3, wherein the samples $X_n$ provided by ADC 42 are sent to a device 45 before they are applied to a device similar to that of FIG. 2. Device 45 comprises a first second-order digital bandpass filter centered at the frequency of the alarm tone, i.e. F=325 Hz. Said first filter includes two delay cells 50 and 52, three multipliers which multiply their inputs by fixed coefficients $\delta_0$, $\delta_1$ and $\delta_2$, respectively, and an adder 54.

The feedback loop of said first bandpass filter includes a limiter (L) 56. If the samples fed to limited 56 are designated Zn, there will be obtained at the output of limiter 56 digital terms Yn such that $Y_n = Z_n$ if $-B \leq Z_n \leq B$ $Y_n = B$ if $Z_n > B$ $Y_n = -B$ if $Z_n < -B$ Threshold B is coded with 16 bits. By choosing $B = 0.281$, $\delta_0 = 0.267$, $\delta_1 = 0.749$ and $\delta_2 = 0.92188$, proper detection of the alarm tone can be achieved with ADC 42 saturated.

Device 45 further includes an input feedforward loop of gain $\gamma$ that feeds an adder 58 located at the output of the first filter and, therefore, at the input of hard limter 44. The purpose of this feedforward loop is to prevent noise or certain sequences of data from being erroneously detected as a 325 Hz alarm tone.

The choice of the value of coefficient $\gamma$ is critical if it is desired to detect alarm tones in a wide range of alarm tone-to-data signal amplitude ratios. The value of $\gamma$ is chosen such that $E Z_n^2 \gtrsim \gamma^2 E X_n^2$ where the received signal is a data signal (which may include noise of a level much lower than that of the data), that is, a data signal that includes no alarm tone, where E is the mathematical expectation or arithmetic mean value of the terms that follow this symbol, i.e. Xn or Zn, and, $\gtrsim$ means greater than or little different from.

The coefficient $\gamma$ artificially decreases the tone-to-signal ratio at the input of hard limiter 44. Should a spurious low-level alarm tone be obtained at the output of the first bandpass filter, its energy shall be maintained sufficiently low relative to that of the wideband signal $\gamma$ Xn to prevent its being detected as an alarm tone.

The output of adder 58 is applied to a device similar to that of FIG. 2 comprising a hard limiter 44, a (second) digital bandpass filter centered at the frequency of the alarm tone, and a device (48, 50) for measuring the energy of the output signal provided by said second digital filter.

While the invention has been particularly shown and described with reference to a preferred embodiment thereof, it will be understood by those skilled in the art that numerous changes in form and details may be made therein without departing from the spirit and scope of this invention. Although the tone receiver of the invention has been described above as intended to detect an alarm tone, it will be readily apparent that it could also be used for detecting any other type of tone.

I claim:

1. A tone receiver for use in a digital data communication system for detecting a presence, within a received signal, of a tone whose frequency lies outside the spectrum of a data signal, said receiver including:

an analog-to-digital converter (ADC) for sampling the received signal and converting samples Xn thereof to digital form and outputting said converted samples;

a first recursive digital bandpass filter having an input and an output and centered at the frequency of the tone signal, the input of which is connected to said ADC output;

a limiter having an input and an output and serially inserted within the feedback loop of said first bandpass filter;

an input feedforward loop having an input and an output and connected to said ADC output and providing a predetermined gain $\gamma$;

an adder having at least two inputs and an output said inputs being connected to the outputs of said first filter and of said feedforward loop;

a hard limiter having an input and an output and connected to the output of said adder;

a second digital filter connected to the output of said hard limiter and providing an input signal; and, means responsive to the signal provided by said second digital filter for measuring the energy V of the signal provided thereby and for indicating receipt of said tone when the energy V exceeds a predetermined threshold value.

2. A tone receiver according to claim 1, wherein the input of said limiter is fed with samples Zn and the output of said limiter provides digital terms Yn which are applied to one of the said adder inputs such that:

$Y_n = Z_n$ if $-B \leq Z_n \leq B$ $Y_n = B$ if $Z_n > B$ $y_n = -B$ if $Z_n < -B$ where B is a threshold of predetermined value.

3. A tone receiver according to any one of claims 1 or 2, wherein in an absence of tone said gain $\gamma$ is chosen according to the expression:

$E Z_n^2 \gtrsim \gamma^2 E X_n^2$.

4. A tone receiver according to claim 3, wherein the value of the output of said hard limiter is set equal to a digital value $+A$ when the digital samples fed thereto are positive or equal to zero, and to a digital value $-A$ when said samples are negative.

5. A tone receiver according to claim 4, wherein the tone is indicated as detected at an output of the receiver whenever said energy V exceeds a given threshold during a predetermined number of consecutive measurements.

6. A tone receiver according to claim 5, wherein said tone represents an alarm signal transmitted by a modem.

* * * * *